Nov. 26, 1968  F. VILBIG  3,412,955
SATELLITE CONSTRUCTION
Filed Oct. 21, 1966  3 Sheets-Sheet 1
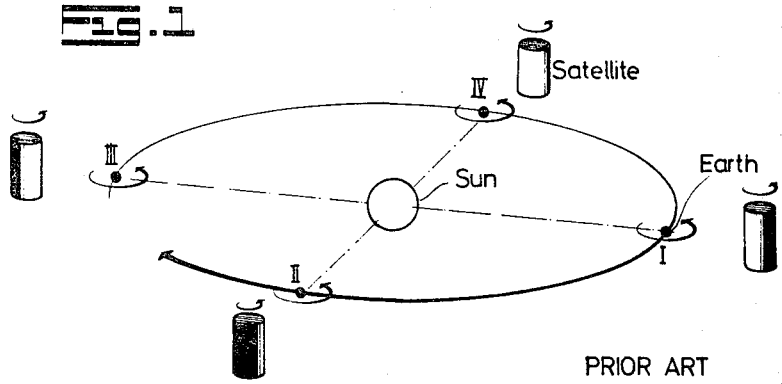
PRIOR ART
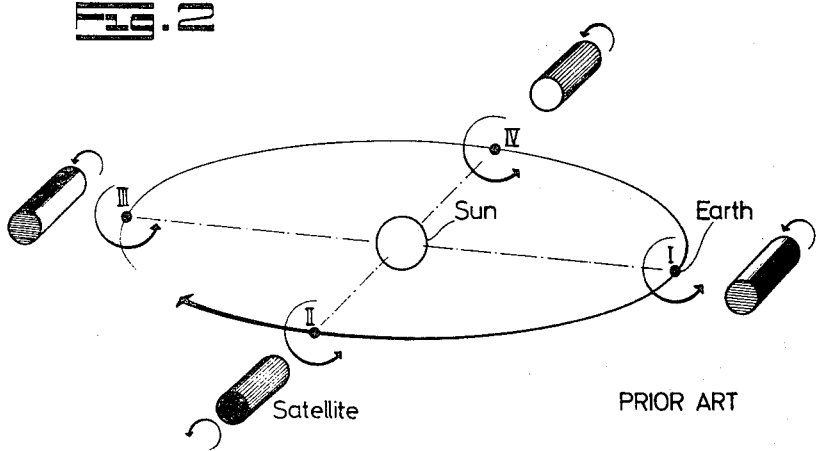
PRIOR ART
INVENTOR
Friedrich Vilbig
By McGlew and Toren
ATTORNEYS Nov. 26, 1968   F. VILBIG   3,412,955
SATELLITE CONSTRUCTION
Filed Oct. 21, 1966   3 Sheets-Sheet 2
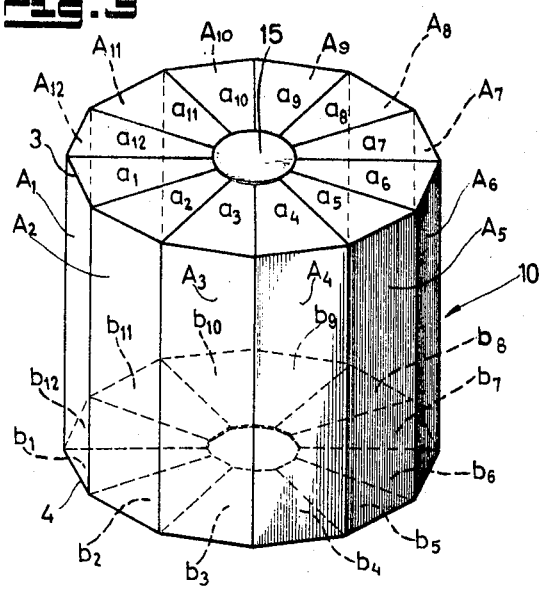
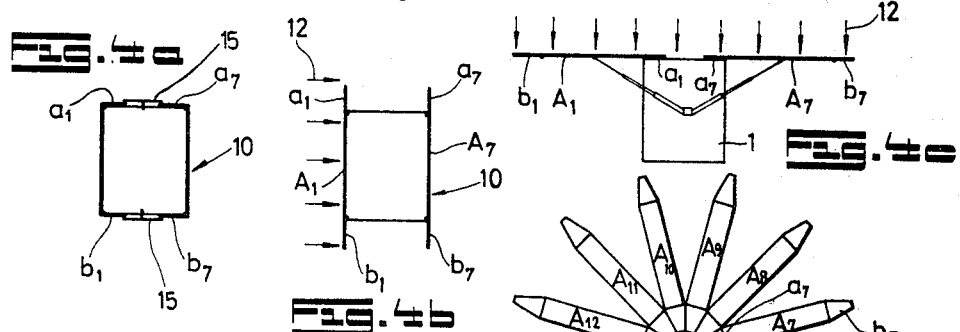
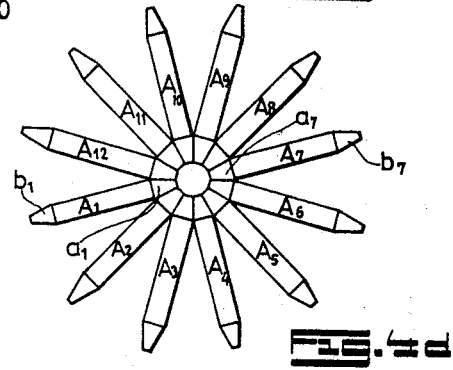
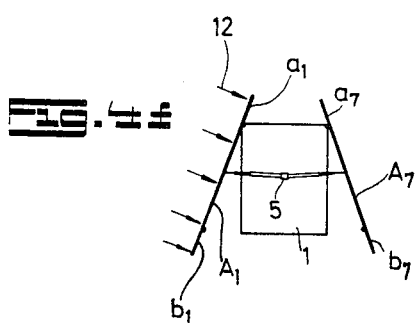
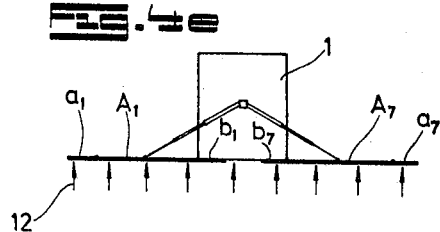
INVENTOR
Friedrich Vilbig
By McGlew and Toren
ATTORNEYS

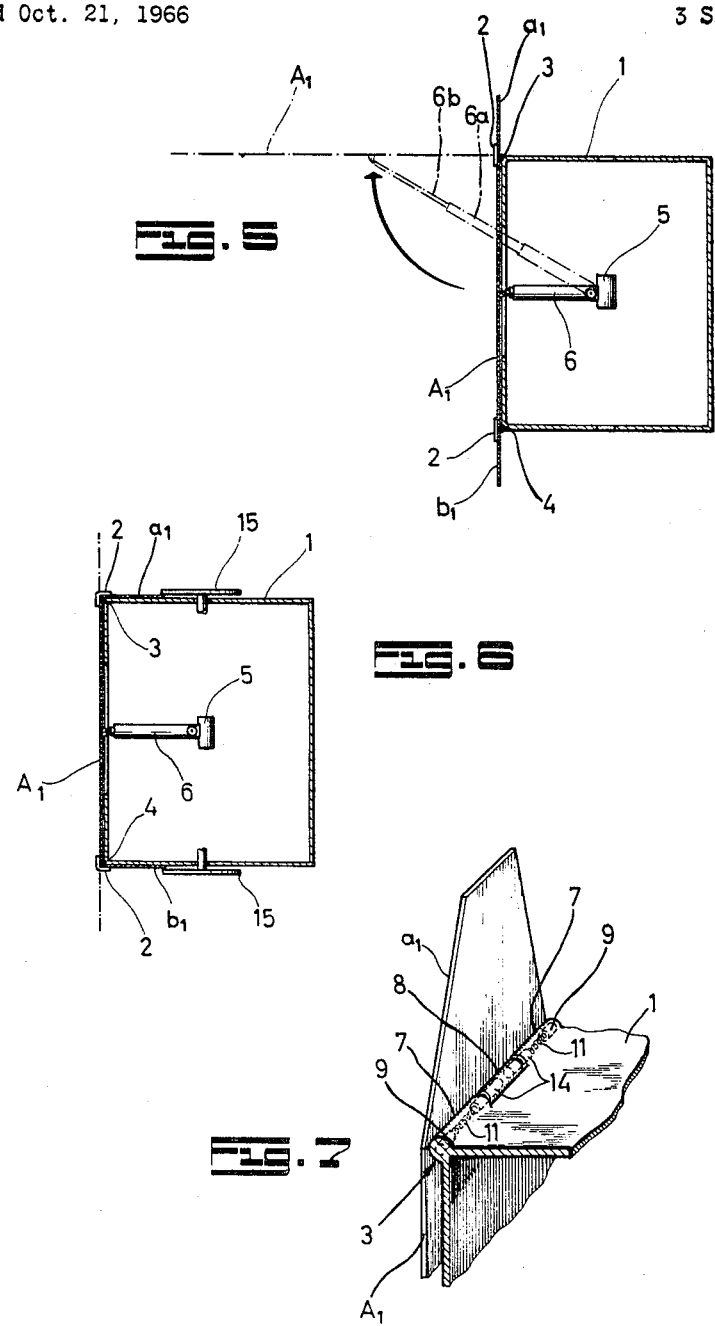

United States Patent Office 3,412,955
Patented Nov. 26, 1968

3,412,955
SATELLITE CONSTRUCTION
Friedrich Vilbig, Munich-Solln, Germany, assignor to Bolkow Gesellschaft mit beschrankter Haftung, Ottobrunn, near Munich, Germany
Filed Oct. 21, 1966, Ser. No. 588,600
Claims priority, application Germany, Oct. 26, 1965, B 84,254
10 Claims. (Cl. 244—1)

This invention relates, in general, to the construction of satellites and, in particular, to a new and useful satellite having a substantially drum-shaped body with panels having solar cell faces which are mounted on the body so that they may be pivoted for the most beneficial orientation in respect to the sun regardless of the attitude of the satellite in its orbit.

Satellites which carry solar cells must be constructed so that the solar cells which serve to supply power are oriented in respect to the sun so that they will receive optimum energy transformation at any point of the orbit. This requires that the solar panel faces be oriented so that they receive a substantially perpendicular incidence of the sun rays. In the case of a satellite which is of a drum shape or cylindrical shape, it will move in an orbit in the equatorial plane of the earth so that its side curved surface having solar cells will be exposed to the same sun rays when the satellite is spin stabilized about a plane perpendicular to the equatorial axis of the earth, provided the variable distance between the sun and the earth and the inclination of the ecliptic is disregarded. If the satellite moves in a plane which is inclined to the equator of the earth, then when the satellite moves in the extreme locations, that is, in the solar plane, the solar cells arranged on the side or esteral surface of the satellite are oriented perpendicularly to the sun rays only for a portion of the orbit while for another portion of the orbit only the end faces of the satellite are oriented so that they may be effectively irradiated by the sun.

Thus, the drum-shaped satellite is particularly advantageous for equatorial satellite orbits but becomes less desirable as the plane of the satellite orbit is inclined with respect to the equatorial plane. In the case of spherical satellites which are equipped with solar cells, they are independent of the inclination of the satellite orbit but the total maximum solar cell power is less than in the drum-shaped satellites of comparable size because the sphere, as is well known, is a body with the smallest surface for a given volume.

It has been known to employ so-called sun paddles which are elements which contain the solar cells and which are constantly adjusted so that the solar cells arranged thereon are exposed to a perpendicular radiation of the sun if possible. However, such devices are not sufficient to achieve completely satisfactory sun utilization with the most effective satellite design configuration.

In accordance with the present invention, there is provided a satellite construction which includes a substantially drum-shaped body which is spin stabilized and which includes solar cells arranged in a fashion such that substantially all of the cells may be exposed to substantially perpendicular radiation of the sun independent of the satellite orbit. To this end, the drum body is provided with segment-shaped panels containing the solar cells arranged around the curved side face of the body and sector-shaped panels arranged at each end of the body. The panels are pivotally mounted such that they may be oriented to receive substantially perpendicular sun rays regardless of the orientation of the body as it moves in orbit. The panels are pivotally mounted on the body so that at least the segment strips or side panels may be pivoted from either end. For this purpose, the pivotal connections include hinge pins which may be moved out of engagement with the associated hinge on one end of the side panel in order to permit the opposite end to pivot about the hinge pins which will be engaged at this end. In this manner, it is possible to orient the panels in the most desirable attitude in respect to the sun by pivoting them up to a range of no more than 90°.

Thus, in accordance with the invention, the advantage of a drum-shaped satellite which is of simple construction and high maximum solar cell inherent power may be combined with the advantages of the sun paddle-type satellite in order to insure that the solar cells carried thereby receive the most beneficial incidence of sun rays. The construction is such that the solar cells carried by the satellite may be oriented so that they may all be used or some of them may be disassociated from the body in the event that they need not be employed because the power requirements permit their non-use. The construction therefore permits a satellite construction having less weight than in prior art devices and, in addition, some of the faces of the satellites may be used for purposes other than for receiving solar energy.

Accordingly, it is an object of the invention to provide a satellite having a substantially cylindrical body configuration and including solar cells thereon carried in panels which may be pivoted to orient the panels in the most desirable orientation in respect to the sun.

A further object of the invention is to provide a satellite construction including a cylindrical body with the esteral surface divided into segments forming panels having solar cells and with the end surfaces divided into sectors forming end panels with solar cells and wherein both sets of the panels are mounted on hinges permitting their pivotal movement into the most desired orientation in respect to the sun and wherein the side segment panels are hinged on the body so that they may be pivoted about either of their ends.

A further object of the invention is to provide a satellite having the most desirable configuration and including solar cells thereon which are contained in panels which may be oriented for the most advantageous reception of the sun's energy.

A further object of the invention is to provide a satellite construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a schematic perspective view showing attitude of a cylindrical satellite in an equatorial orbit;

FIG. 2 is a view similar to FIG. 1 indicating the attitude of a cylindrical satellite in an orbit in which it is inclined in respect to the equatorial plane of the earth;

FIG. 3 is a top side perspective view of a satellite constructed in accordance with the invention;

FIGS. 4a–4e are somewhat schematic indications of a satellite constructed in accordance with the invention arranged with a solar panels thereon oriented in various arrangements in accordance with the incidence of the solar rays;

FIG. 5 is a transverse somewhat schematic sectional view indicating the mechanism for orienting the solar panels;

FIG. 6 is a view similar to FIG. 5 with the end sector panels in a folded condition; and FIG. 7 is an enlarged sectional and elevational view of the solar panel hinge mounting on the body.

Referring to the drawings in particular, it can be seen in respect to FIG. 1 that when a drum-shaped satellite which is spin stabilized orbits around the sun in an orbit extending in the equatorial plane of the earth, its surface which is equipped with solar cells arranged to conform to the outline of the drum-shaped configuration would be constantly exposed to the same sun rays in the annular revolution of the satellite about the sun, disregarding the variable distance between the sun and the earth and the inclination of the ecliptic.

If the satellite moves in a plane inclined to the equator of the earth as shown in FIG. 2, then in the extreme case, for example, in the polar plane, the solar cells arranged on the esteral surface of the satellite would be oriented perpendicularly to the sun rays only on a part of the orbit, that is, in the positions indicated by I and II. On the other part of the orbit in positions indicated III and IV, only the end faces of the satellite which are also equipped with solar cells are irradiated by the sun. It can thus be seen that a drum-shaped satellite configuration is particularly advisable for equatorial satellite orbits but becomes somewhat less desirable when the plane of the satellite orbit is inclined with respect to the equatorial plane.

In accordance with the invention, a satellite generally designated 10, as indicated in FIG. 3, is provided with an esteral or side face made up of a plurality of surface segments or strips $A_1$, $A_2$, $A_3$, $A_4$, etc., each of which carries solar cells. The end faces are provided with end face sectors or strips $a_1$ $a_2$, $a_3$, $a_4$, etc. on one end and $b_1$, $b_2$, $b_3$, etc. on the opposite end.

A feature of the invention is the manner in which the sectors and segments are hingedly connected to the cylindrical body 1 of the satellite 10. As indicated in FIGS. 5 to 7, the cylindrical satellite body carries an operating device 5 for displacing each of the segments $A_1$, $A_2$, $A_3$, etc. in respect to the body. The operating device 5 includes means for actuating a fluid cylinder 6 which is pivotally connected to each sector, for example, sector $A_1$, as indicated in FIG. 5. The cylinder 6 includes telescopic members 6a and 6b which may be extended as indicated in dotted lines in FIG. 5. When the control device 5 is actuated, as shown in FIG. 5, the panel $A_1$ with the solar cells thereon may be shifted from an orientation in which it is arranged along the side of the body 1 to an orientation at which it extends parallel to the end face of the body 1 as indicated in dotted lines in FIG. 5.

A feature of the construction is the hinge connection of the segments $A_1$ to the sector $a_1$ and their pivotal mounting in respect to the ends of the body 1. The sectors $a_1$ and $b_1$ are connected to the respective ends of the segments $A_1$ and the body 1 by hinges 3 and 4, respectively. A spring 2 is arranged with each sector so that the sector $a_1$ and the sector $b_1$ will ordinarily be biased by the respective spring to a position at which it aligns with the plane of its associated segment $A_1$. Normally, the satellite would be orbited with the sectors $a_1$ and $b_1$ oriented as diciated in FIG. 6 and the sectors would be unlocked by releasing locking means 55, after the satellite is in orbit to permit the spring 2 to move them outwardly to the dotted line position. By this expedient, the satellite 10 would be transformed from the configuration indicated in FIG. 4a to the configuration indicated in FIG. 4b in which all of the sectors $a_1$, $a_2$, $a_3$, etc. and $b_1$, $b_2$, $b_3$, etc. are oriented in the same plane as the side segments $A_1$, $A_2$, $A_3$, etc. so that they can receive the rays of the sun 12 at right angles to their surfaces.

In order to permit the segments $A_1$, $A_2$, $A_3$, etc. to be oriented to extend outwardly from a pivotal connection at either the top or the bottom of the housing 1, the hinge construction 3, as indicated in FIG. 7, is made to permit separation of each hinge in the event that it is the opposite hinge about which the associated segment is to be pivoted.

As indicated, the hinge 3 includes two outer hinge parts 7, 7 which are carried by the body and an inner or central hinge part 8 which is carried by the segments $A_1$. A releasable hinge pin 14 is forced from each associated outer hinge part 7 into the central hinge part 8 by the action of a spring 11. When it is desired to pivot the sector $A_1$ about a hinge which is opposite the one indicated in FIG. 7, then a solenoid or electromagnet 9 is actuated to withdraw the pins 14, 14 from the central hinge part 8 to free this end of the segment and permit the segment to move outwardly about a pivot at the opposite end of the body 1.

As indicated in FIG. 4c, the segments $A_1$, $A_2$, etc. may be oriented so that they align with the sections $a_1$, $a_2$, etc. on the end faces of the body 1. Since the sectors $a_1$, $a_2$, etc. carry the segments $b_1$, $b_2$, $b_3$, etc., they will also be oriented parallel to the end face having the sectors $a_1$, $a_2$, etc., so that they will receive the rays of the sun 12 in a perpendicular manner as indicated. The end view of the satellite would then appear as indicated in FIG. 4d.

If desired, the hinge at the opposite end of the body 1 may be connected to the body by the associated hinge pins 14, 14 but the ones at the top end may be released as indicated in FIG. 4e to permit the orientation of all of the segments $A_1$, $A_2$, etc. together with their associated sectors $a_1$, $a_2$, etc. in the plane of the sectors $b_1$, $b_2$, etc.

There is also the possibility for the arrangement indicated in FIG. 4f in which the segments $A_1$, $A_2$, $A_3$, etc. and the associated sectors $a_1$, $a_2$, $a_3$ etc. and $b_1$, $b_2$, $b_3$, etc. are all arranged along an oblique line in order to receive the oblique sun rays 12.

Since the spin stabilized satellite will rotate about its longitudinal axis, the spin stabilzation is maintained because of the axially symmetrical arrangement of the segments and sectors. The speed of the rotation will vary with the displacement of the mass in the different positions of the surfaces. The speed of rotation is highest when the masses of the surfaces are closest to the axis of rotation and it will be lowest when they are farther away from the axis of rotation.

While a specific embodiment of the invention has been shown and described in detail to illustrate the application of the inventive principles, it will be understood that the invention may be embodied otherwise without departing from such principles.

What is claimed is:

1. A drum-shaped satellite, particularly a spin stabilized satellite, having a lateral surface and end faces with solar cells for the energy supply, said lateral surface being formed of a plurality of strip-shaped segments with said solar cells being arranged on the faces of said segments, said end surfaces including a plurality of strip-shaped sectors with a solar cell associated therewith, and disengageable hinge means securing said sectors and said segments on said satellite permitting the pivoting of said segments and said sections up to 90° for the purpose of changing the orientation of the solar cells in respect to the position of the satellite in respect to the sun.

2. A drum-shaped satellite, according to claim 1, wherein said sectors are hingedly connected to said satellite adjacent each end, and means for disengaging said hinges adjacent at least one end of said segments to permit pivotal movement of said segments about the opposite end.

3. A drum-shaped satellite, according to claim 1, including a telescopic member connected to said segments and including a movable part which is moved to pivot said segments about said hinge.

4. A drum-shaped satellite, according to claim 1, wherein said disengageable hinge means includes a first hinge part carried by said satellite, a second hinge part carried by at least one of said segment and said sector, hinge pin means engageable between said first and second hinge parts for permitting pivotal movement of said parts and electric means connected to said pin means for displacing said pin means to remove the connection from at least one of said parts so that one part is permitted to move away from the other of said parts.

5. A satellite comprising a cylindrical body, a plurality of segmental strips having solar cells arranged around the side of said body, a plurality of sectoral strips having solar cells arranged around each end of said body, and means pivotally mounting said segmental strips on said body and said sectoral strips in relation to said segmental strips to permit the pivotal movement of said segmental and said sectoral strips for orienting said strips in accordance with the location of the sun in respect to said satellite for obtaining the most efficient use of the sun's energy by said solar cells.

6. A satellite according to claim 5, wherein said means pivotally mounting said segmental strip on said body includes a disengageable hinge adjacent each end of said body and means for selectively disengaging the hinge from a respective end of said body for permitting movement of said segmental strip about its other end.

7. A satellite, according to claim 5, wherein said sectoral strips are pivotally connected to a respective one of each of said segmental strips adjacent each end, means for locking said sectoral strips to orient said sectoral strips in a plane corresponding with the associated end of said satellite cylindrical body.

8. A satellite according to claim 7, including spring means for urging said sectoral strips to pivot outwardly into a plane overlying its associated segmental strips, and means for locking said sectoral strips in a position at which it overlies the end face of said cylindrical body.

9. A satellite, according to claim 5, wherein said segmental strips are pivotally mounted adjacent each end to the respective ends of said cylindrical body, said sectoral strips being pivotally connected to respective ends of said segmental strips, means connected to said segmental strip to pivot said segmental strip about a respective end, said pivotal mounting means including a disengageable hinge hingedly connecting said segmental strip to each end of said body, and means for disengaging a respective one of said disengageable hinges for pivoting said segmental strip about the opposite one of said hinges.

10. A satellite, according to claim 5, wherein said means pivotally mounting said segmental strip on said body includes a first detachable hinge adjacent one end of said body hingedly supporting said segmental strip adjacent said one end, a second disengageable hinge adjacent the opposite end of said body hingedly supporting said segmental strip adjacent said opposite end, said sectoral strips being pivotally connected to each of said ends of said segmental strips, said first and second disengageable hinges including a first hinge part on said segmental strip and a second hinge part on said body engageable with said first hinge part and means for moving said hinge parts out of engagement, and a telescopic control member connected to said segmental member intermediate its length, said telescopic control member including a member movable to shift said segmental strip in relation to said body for the purpose of changing the orientation thereof in respect to said body, spring means for biasing said sectoral strip to a position in which it lies in the same plane as its associated segmental strip, and lock means on said body for locking said sectoral strip on said body in a position overlying an end face thereof until said body is in orbit.

References Cited

UNITED STATES PATENTS

| 3,152,774 | 10/1964 | Wyatt | 244—1 |
| 3,347,309 | 10/1967 | Webb | 244—1 |

MILTON BUCHLER, *Primary Examiner.*

B. BELKIN, *Assistant Examiner.*